United States Patent
Turatti

(10) Patent No.: US 10,398,164 B2
(45) Date of Patent: Sep. 3, 2019

(54) MACHINE FOR CLEANING UP FRUITS, PARTICULARLY STRAWBERRIES AND RADISHES

(71) Applicant: Turatti S.R.L., Venice (IT)

(72) Inventor: Antonio Turatti, Venice (IT)

(73) Assignee: Turatti S.R.L., Venice (IT)

(*) Notice: Subject to any disclaimer, the term of this patent is extended or adjusted under 35 U.S.C. 154(b) by 533 days.

(21) Appl. No.: 14/783,338

(22) PCT Filed: Apr. 14, 2014

(86) PCT No.: PCT/IT2014/000109
§ 371 (c)(1),
(2) Date: Oct. 8, 2015

(87) PCT Pub. No.: WO2014/170923
PCT Pub. Date: Oct. 23, 2014

(65) Prior Publication Data
US 2016/0050967 A1    Feb. 25, 2016

(30) Foreign Application Priority Data
Apr. 15, 2013    (IT) .............................. RM2013A0225

(51) Int. Cl.
*B26D 3/16*    (2006.01)
*A23N 15/02*    (2006.01)
*A23N 15/04*    (2006.01)

(52) U.S. Cl.
CPC .............. *A23N 15/02* (2013.01); *A23N 15/04* (2013.01); *B26D 3/16* (2013.01)

(58) Field of Classification Search
CPC ............ A23N 15/02; A23N 15/04; B26D 3/16
(Continued)

(56) References Cited

U.S. PATENT DOCUMENTS

| 1,995,694 A | * | 3/1935 | Urschel | A23N 15/08 83/102 |
| 2,731,051 A | | 1/1956 | Wormser et al. | |

(Continued)

FOREIGN PATENT DOCUMENTS

| GB | 2377161 A | * | 1/2003 | ............. A23N 15/04 |
| WO | 0228207 A1 | | 4/2002 | |

OTHER PUBLICATIONS

Search Report & Written Opinion issued by International Searching Authority in related International Patent App. No. PCT/IT2014/000109 dated Oct. 8, 2014 (10 pages).

(Continued)

*Primary Examiner* — Tu B Hoang
*Assistant Examiner* — Vy T Nguyen
(74) *Attorney, Agent, or Firm* — Gesmer & Updegrove LLP

(57) ABSTRACT

A machine for cleaning up fruits, particularly strawberries and radishes is disclosed. The machine includes closed loop conveyor belt (5) for conveying fruits, a vacuum-generating means (8), and first cutting means (11). The closed loop conveyor belt (5) is provided with an upper conveying branch (5a), a lower returning branch (5b) and two front and rear connecting portions (5c, 5d), respectively, a plurality of holes (6) that are formed in the conveyor belt (5), and the conveyor belt (5) is movable by rollers (3, 4) along a predetermined advancing direction (A). The vacuum-generating means (8) includes distributing means (10) arranged under at least a predetermined portion of the upper conveying branch (5a). The first cutting means (11) cutting fruits is arranged in the plurality of holes (6) according to a cutting line substantially perpendicular to the advancing direction (A).

6 Claims, 4 Drawing Sheets

(58) Field of Classification Search
USPC .... 99/643, 636, 637, 635, 546; 83/100–700; 198/300–800; 426/300–600
See application file for complete search history.

(56) References Cited

U.S. PATENT DOCUMENTS

| | | | | |
|---|---|---|---|---|
| 2,793,734 A * | 5/1957 | Lorenzen | ................ | A23N 3/00 198/380 |
| 3,093,175 A * | 6/1963 | Morici | ................... | A23N 7/01 99/353 |
| 3,653,418 A * | 4/1972 | Oldershaw | ............ | A23N 15/04 99/639 |
| 3,690,049 A * | 9/1972 | Roberson | ............... | A01D 45/26 171/27 |
| 4,122,766 A * | 10/1978 | Ledebuhr | ............... | A23N 15/02 198/394 |
| 4,168,642 A * | 9/1979 | Evans | ................. | A23N 15/003 83/404.3 |
| 4,800,704 A * | 1/1989 | Ishii | ....................... | B65B 25/04 198/458 |
| 5,470,602 A * | 11/1995 | Cecil | .................... | A23N 15/003 426/481 |
| 5,590,591 A * | 1/1997 | Kim | ........................ | A23N 4/12 99/472 |
| 5,996,482 A * | 12/1999 | Kirk | ........................ | A23N 4/18 99/516 |
| 8,430,006 B2 * | 4/2013 | Stanojevic | ............ | B26D 1/553 414/749.1 |
| 2005/0247214 A1 * | 11/2005 | Huddle | .................. | A23N 15/04 99/636 |
| 2008/0011166 A1 * | 1/2008 | Suzuki | ................... | A23N 15/00 99/636 |
| 2009/0217793 A1 * | 9/2009 | Spillner | ................. | B26F 3/004 83/289 |

OTHER PUBLICATIONS

Search Report & Written Opition, and translation of Written Opinion) issued by the Italian Patent Office in related Italian Patent Application No. IT RM20130225 dated Dec. 10, 2013 (6 pages).

* cited by examiner

MACHINE FOR CLEANING UP FRUITS, PARTICULARLY STRAWBERRIES AND RADISHES

PRIORITY

The present application is a continuation of PCT Application No. PCT/IT2014/000109 field Apr. 14, 2014, that claims priority to IT Application No. RM2013A000225, filed on Apr. 15, 2013, both of which are incorporated herein by reference in their entireties.

BACKGROUND

The present invention relates to a machine for cleaning up fruits, particularly strawberries and radishes, operating in such a way to permit removal of scrap parts.

More specifically, the invention relates to a machine of the above kind, particularly studied and realized for working strawberries and radishes, but that can be used for other fruits.

In the following, the specification will be addressed to the working of strawberries, but it is well evident that the same must not be considered limited to this specific use.

Traditionally, when preparing at an industrial level strawberries from which green scrap parts have been removed, removal of the latter is carried out manually by workers responsible for this task.

However, manual technique for cleaning up strawberries involves real risks for safety of the same workers that could injure themselves by tools used to cut strawberries.

Another remarkable drawback of the above manual techniques is represented by working time, which is very long.

Semiautomatic machines for cleaning up strawberries are known, the operation of which requires in any case the intervention of a worker.

Also this kind of machines require quite long working times, although shorter than those characterizing the above mentioned completely manual cleaning up techniques.

In view of the above, it is therefore object of the present invention that of providing a machine for cleaning up fruit, particularly strawberries and radishes, permitting overcoming the above problems and drawbacks of the known solutions.

Another object of the invention is that of providing a machine for cleaning up fruit, particularly strawberries and radishes, which is polyvalent, reliable and economical.

SUMMARY

It is a specific object of the present invention a machine for cleaning up fruits, particularly strawberries and radishes, comprising:

a closed loop conveyor belt for conveying fruits, provided with an upper conveying branch, a lower returning branch and two front and rear connecting portions, respectively, being arranged between said upper conveying branch and lower returning branch, a plurality of holes are formed in said conveyor belt, each hole being adapted to receive a fruit; actuating means for moving said conveyor belt along a predetermined advancing direction;

vacuum-generating means comprising distributing means being arranged under at least a predetermined portion of said upper conveying branch and within at least an operative portion of the front connecting portion, said at least an operative portion being adjacent to said predetermined portion of said upper conveying branch to generate an attracting force directed towards said conveyor belt, said attracting force acting on the fruits in the holes in said at least a predetermined portion of said upper conveying branch and in said at least an operative portion of said front connecting portion; said operative portion of the front connecting portion being greater than half of said front connecting portion; and first cutting means, for cutting fruits being arranged in said plurality of holes according to a cutting line substantially perpendicular to said advancing direction.

According to the invention, said machine can comprise a first collecting area and a second collecting area, respectively, for collection of discarding parts of fruits cut by the first cutting means and collection of parts of fruits cut by the first cutting means; said first and second collecting area being located under the conveyor belt at an end region of the operative portion of said front connecting portion and at a middle region of said front connecting portion, respectively.

Still according to the invention, said first cutting means can comprise a saw-toothed metal band or a cutting wire.

Advantageously, according to the invention, said plurality of holes can be arranged along at least one row substantially parallel to said advancing direction and wherein said machine comprises second cutting means aligned with said at least a row and adapted to cut fruits arranged in said plurality of holes according to at least a cutting line lying on a plane substantially parallel to said advancing direction.

Furthermore, according to the invention, said second cutting means can comprise at least one cutting edge disc.

According to the invention, said machine can comprise a frame, wherein the second cutting means is fixedly mounted on said frame.

Still according to the invention, said machine can comprise a frame, wherein the second cutting means is mounted in a removable way on said frame.

Advantageously, according to the invention, said machine can comprise a frame, wherein the second cutting means is movable between an operating position and a neutral position, relative to said frame.

BRIEF DESCRIPTION OF THE DRAWINGS

The present invention will be now described, for illustrative, but not limitative, purposes, according to its preferred embodiments, with particular reference to the figures of the enclosed drawings, wherein.

Same reference numbers will be used in the various figures to indicate the same parts.

DETAILED DESCRIPTION

Figure 1:
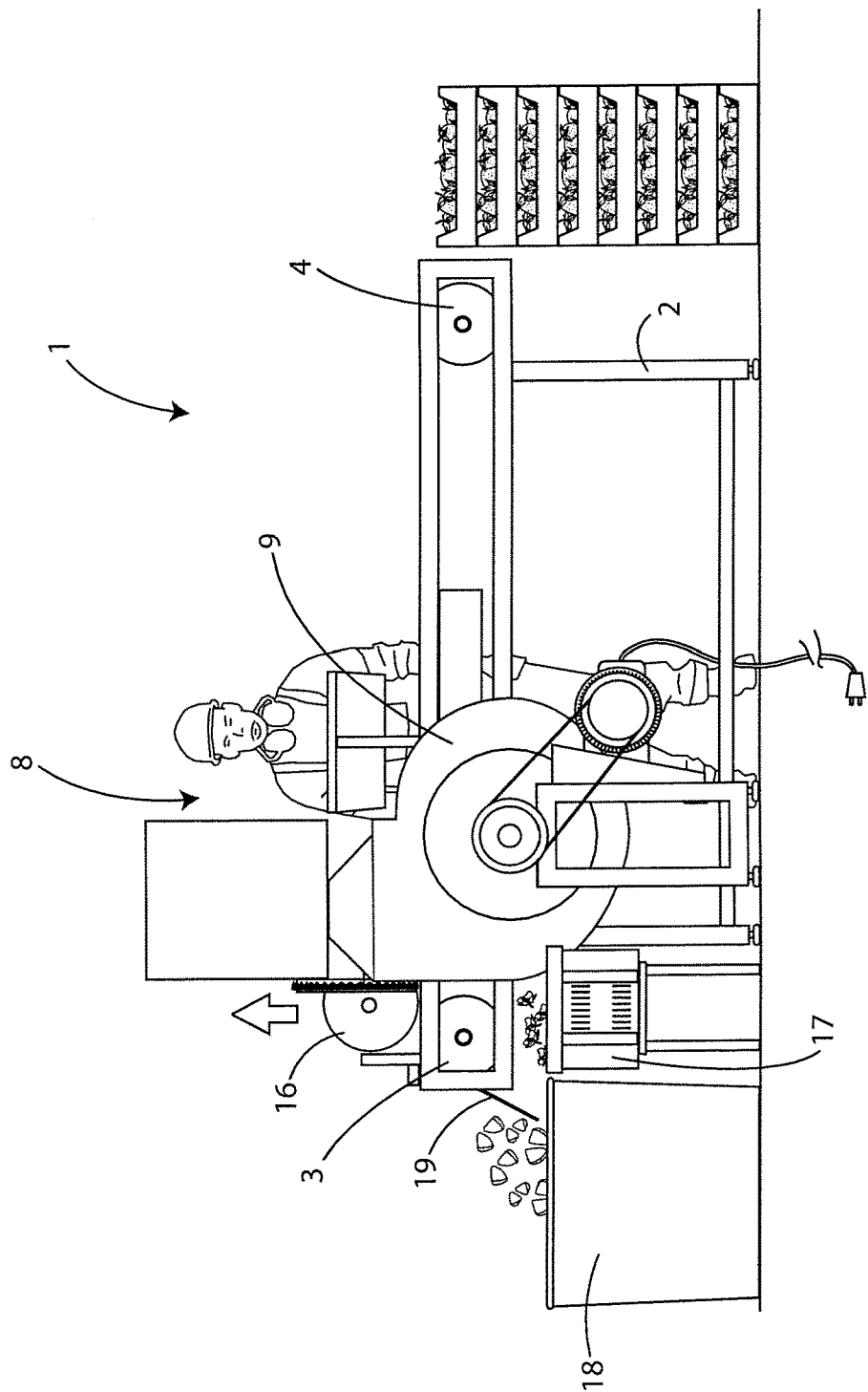
FIG. 1 is a first lateral view of a machine for cleaning up fruits, particularly strawberries and radishes according to the present invention.
Figure 2:
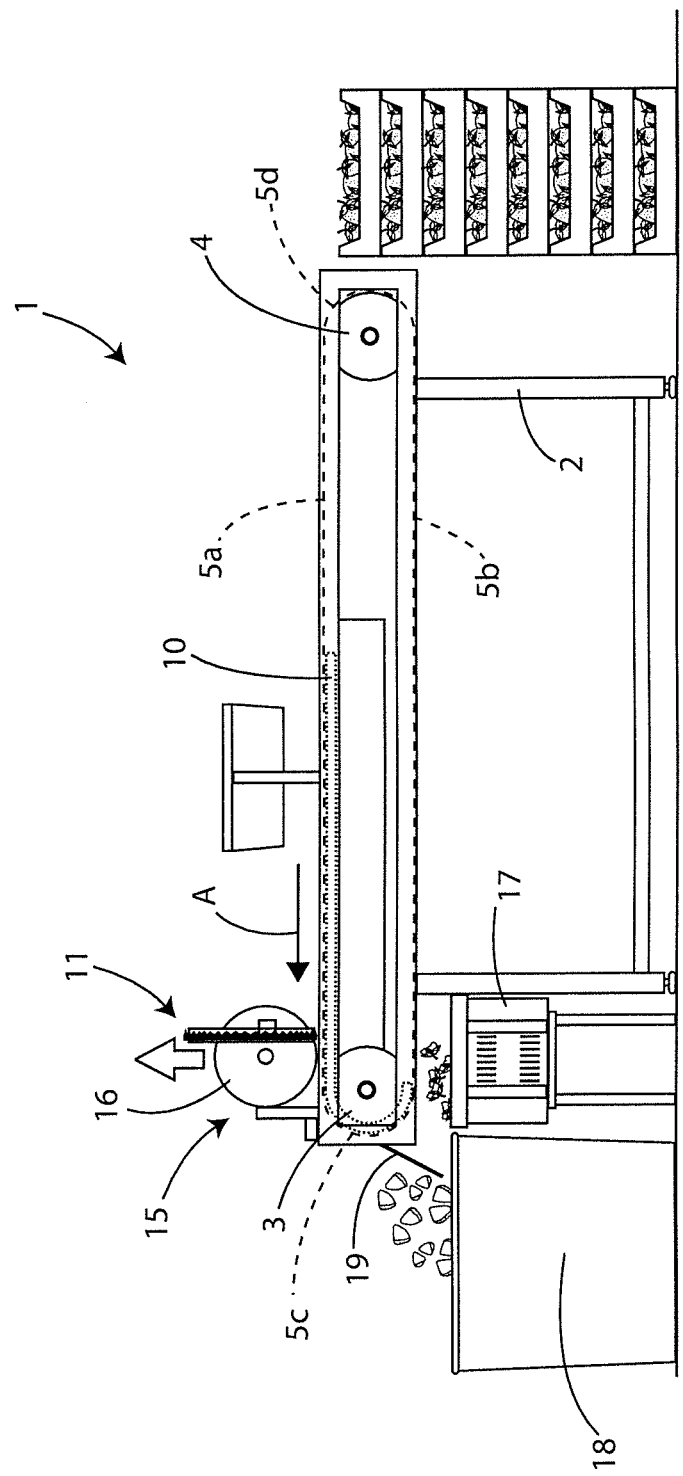
FIG. 2 is a second lateral view of the machine of FIG. 1.
Figure 3:
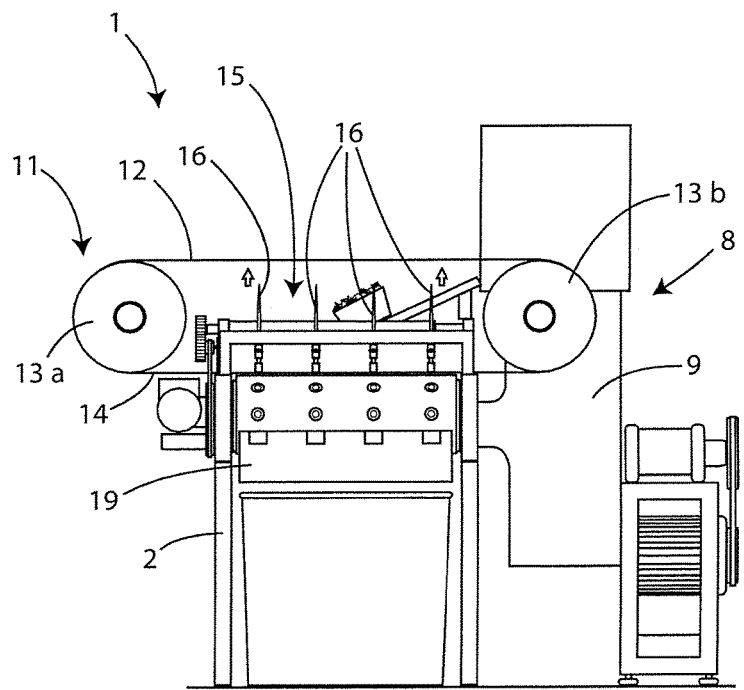
FIG. 3 is a front view of the machine of FIGS. 1 and 2.

Making reference to the enclosed drawings, by reference 1 it is indicated a machine for cleaning up strawberries that can be advantageously used also for other fruits.

Machine for cleaning up strawberries 1 comprises a frame 2, on which two rotating rolls 3, 4 are mounted, and a closed conveyer belt 5 is wound about said rolls 3, 4, for transportation of strawberries, or of another fruit to be cleaned up, said conveyor belt 5 being comprised of a substantially rectilinear upper conveying branch 5a, a substantially rectilinear lower returning branch 5b, a curved front connecting portion 5c, and a curved rear connecting portion 5d. Conveyor belt 5 is connected, by rolls 3, 4 one of which is actuatable, to move the same according to a predetermined advancing direction A.

A plurality of hole rows 6 is realized on conveyor belt 5, suitable for receiving strawberries to be subjected to working; said hole rows 6 are provided parallel with respect to the above predetermined advancing direction A.

Machine for cleaning up strawberries 1 also provides a vacuum-generating system 8, comprising a vacuum pump 9 in flow communication with a distributing member 10 arranged within the conveyor belt 5 so as to create a vacuum condition in correspondence of the holes 6 provided in a predetermined portion of under at least a predetermined portion of the upper conveying branch 5a, and in an active portion, bigger than the half, of the front connecting portion 5c, adjacent with respect to said predetermined portion of the upper conveying branch 5a.

A cross cutting device 11 is provided above the distribution member 10 and above the upper conveying branch 5a of the conveyor belt 5, in correspondence of an end zone of the latter, said cutting device 11 comprising a metallic band 12 provided with saw teeth, or a cutting wire, wound about two rolls 13a, 13b, rotated by actuating means and placed in such a way to define a cutting line 14 substantially perpendicular with respect to said predetermined advancement direction A.

Figure 5:
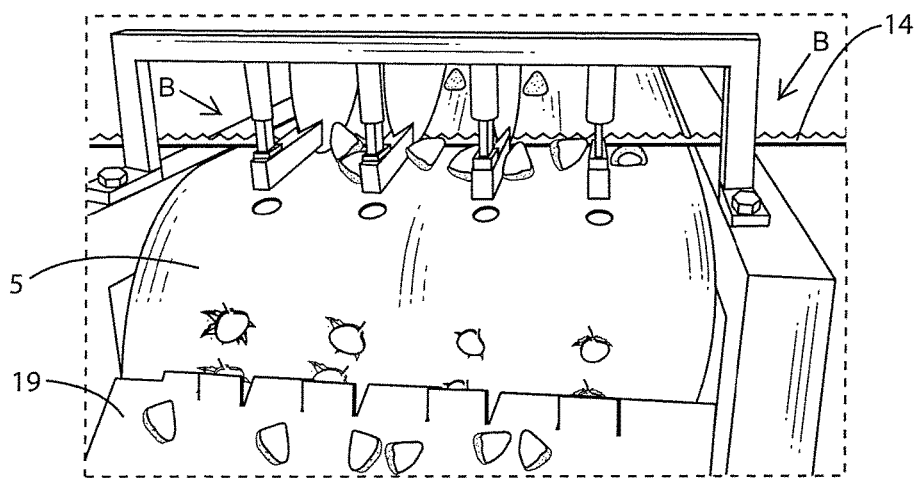
FIG. 5 is a further partial view in greater detail of the machine of FIGS. 1-4.
Figure 4:
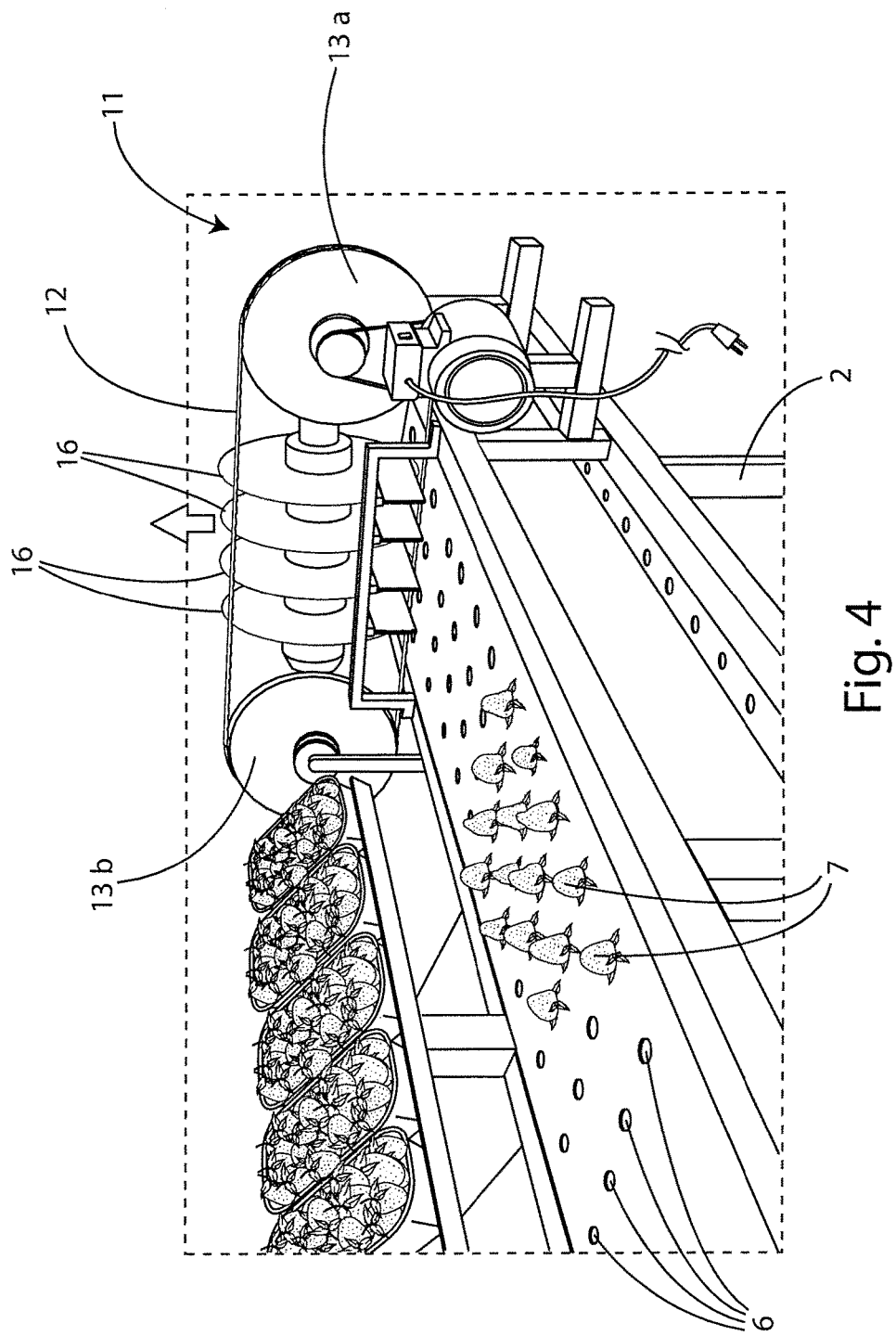
FIG. 4 is a partial view, in greater detail, of the machine of FIGS. 1-3.

A longitudinal cutting device 15 is provided above the upper conveying branch 5a, in correspondence of the cross cutting device 11, that can be fixedly or removably mounted on said frame 2, or in such a way to be moved between a lowered operative cutting position (as shown at B in FIG. 5) and a neutral lifted position, in which it does not act on strawberries provided on conveyor belt 5.

Longitudinal cutting device 15 provides a plurality of cutting edge discs 16, rotated by actuator means and provided aligned with respect to said hole rows 6 on conveyor belt 5, so as to define corresponding cutting lines lying along planes substantially parallel with respect to said predetermined advancing direction (A)).

A first container 17, i.e. a first collection zone, is provided under the conveyor belt 5, in correspondence of an end zone of the active portion of the front connecting portion 5c involved in the vacuum distributing member 10 operation, and aimed at collecting scrap parts of strawberries cut by the cross cutting device 11.

A second container 18, i.e. a second collection zone, is provided under the conveyor belt 5, provided in correspondence of a median area of the front connecting portion 5c involved in the vacuum distributing member 10 operation, and aimed at receiving "good" parts, i.e. not the scrap parts, of strawberries.

Operation of the machine for cleaning up strawberries is the following.

To operate the machine described in the above, it is necessary that strawberries to be subjected to working are before placed by a worked on conveyor belt 5 in correspondence of the holes 6, with the green part to be eliminated faced downward.

When strawberries conveyed by moving conveyor belt 5 pass above distribution member 10, they are subjected to an attraction force toward said conveyor belt due to vacuum generated by system for generating vacuum 8.

Thus, strawberries are carried by conveyor belt 5 toward the zone of the machine where cross cutting device 11 and longitudinal cutting device 15 are provided, said devices respectively cutting strawberries along a cross direction, just above the scrap green part of each strawberry, and a longitudinal direction, dividing each strawberry in two parts.

Cutting edge discs 16 of the longitudinal cutting device 15 are provided very close to the metallic band 12 of the cross cutting device 11, so that longitudinal cutting device 15 acts on each strawberry at the same time, or just before, the cross cutting device 11.

Scrap green parts of strawberries cut by cross cutting device 11 remain adherent to the conveyor belt 5 until when the same reach the above mentioned end part of the active portion of the front connection portion 5c involved by vacuum distribution member 10.

Once reached said end zone, strawberry green scrap parts, no more subjected to the force caused by vacuum generation system 8 by vacuum distribution member 10, fall by gravity within the first container 17.

Strawberry pieces cut by longitudinal cutting device 15, even if no more constrained to holes 6, remain on conveyor belt 5 until when they reach a substantially media zone of said front connecting portion 5c, from which they fall by gravity within the second container 18.

Machine for cleaning up strawberries 1 according to the present invention can advantageously comprise a slide 19, provided on the frame 2 close to said median zone of the front connecting portion 5c of the conveyor belt 5.

A plurality of conveying elements can be provided along said slide 19, to promote collection of green scrap parts and of "good" pieces of strawberries within relevant containers 17, 18.

The present invention has been described for illustrative, but not limitative purposes, according to its preferred embodiments, but it is to be understood that variations and/or modifications can be introduced by those skilled in the art, without departing from the relevant scope as defined in the enclosed claims.

The invention claimed is:

1. A machine for cleaning up fruits, particularly strawberries and radishes, comprising:
   a closed loop conveyor belt (5) for conveying fruits, provided with an upper conveying branch (5a), a lower returning branch (5b) and two front and rear connecting portions (5c, 5d), respectively, being arranged between said upper conveying branch (5a) and lower returning branch (5b), a plurality of holes (6) are formed in said conveyor belt (5), each hole being adapted to receive a fruit, said conveyor belt (5) being movable by rollers (3, 4) along a predetermined advancing direction (A);
   vacuum-generating means (8) including a vacuum pump comprising a distributing member (10) being arranged under at least a predetermined portion of said upper conveying branch (5a) and within at least an operative portion of the front connecting portion (5c), said operative portion (B) being adjacent to said predetermined portion of said upper conveying branch (5a) to generate an attracting force directed towards said conveyor belt (5), said attracting force acting on the fruits in the holes (6) in said at least a predetermined portion of said upper conveying branch (5a) and in said operative portion (B) of said front connecting portion (5c); said operative portion (B) of the front connecting portion (5c) being greater than half of said front connecting portion (5c);
   first cutting means (11) including a saw-toothed metal band (12) or a cutting wire, for cutting fruits being arranged in said plurality of holes (6) according to a cutting line generally perpendicular to said advancing direction (A); and second cutting means (15a), for longitudinally cutting fruits being provided above said upper conveying branch (5a), said second cutting means (15a) includes a plurality of cutting edge discs (16) and are aligned with respect to said holes (6) on said conveyor belt (5), so as to define one or more cutting lines lying along planes generally parallel with respect to said predetermined advancing direction (A).

2. The machine according to claim 1, comprising a first collecting area (17) and a second collecting area (18), respectively, for collection of discarding parts of fruits cut by the first cutting means (11) and collection of parts of fruits cut by the first cutting means (11); said first (17) and second (18) collecting area being located under the conveyor belt (5) at an end region of the operative portion of said front connecting portion (5c) and at a middle region of said front connecting portion (5c), respectively.

3. The machine according to claim 1, wherein said plurality of holes (6) are arranged along at least one row generally parallel to said advancing direction (A) and wherein said second cutting means (15) aligned with said at least a row and adapted to cut fruits arranged in said plurality of holes (6).

4. The machine according to claim 3, comprising a frame (2), wherein the second cutting means (15) are fixedly mounted on said frame (2).

5. The machine according to claim 3, comprising a frame (2), wherein the second cutting means (15) are mounted in a removable way on said frame (2).

6. The machine according to claim 3, comprising a frame (2), wherein the second cutting means (15) is movable between an operating position and a neutral position, relative to said frame (2).

* * * * *